Oct. 12, 1943.  C. B. WOODSON  2,331,588
STEERING WHEEL BUTTON
Filed March 15, 1941

INVENTOR.
CLAUDE B. WOODSON
BY Edward C. Healy
ATTORNEY.

Patented Oct. 12, 1943

2,331,588

UNITED STATES PATENT OFFICE 2,331,588

STEERING WHEEL BUTTON

Claude B. Woodson, San Francisco, Calif.

Application March 15, 1941, Serial No. 383,492

1 Claim. (Cl. 74—557)

This invention relates to improvements in automobile accessories and has particular reference to a rotatable button adapted to be associated with the steering wheel of a motor vehicle, whereby upon contact of the hand of the operator with the button, movement can be readily imparted to the steering wheel to facilitate the turning of the automobile.

The principal object of the invention is to provide a rubberized button equipped with a vacuum or suction surface so that the palm of the hand of the operator, after being placed on the said surface, will be operatively positioned relative thereto, and danger of accidental displacement of the palm of the hand will be eliminated.

A further object of the invention is to provide means whereby the button may be tilted to various operative positions without danger of displacement or slippage of the palm of the hand from the suction surface or the dislodgment of the button relative to the steering wheel.

An additional object of the invention is to provide an efficient and positive means for securing the button to the rim or a spoke of the steering wheel and, further, to provide a device of this character which will be economical to manufacture.

Other objects and advantages will be apparent during the course of the following description.

In the accompanying drawing forming a part of this specification and in which like numerals are employed to designate like parts throughout the same, Fig. 1 is a plan view of the button associated with the steering wheel;

It is a well-known fact that great difficulty is experienced in the turning of an automobile steering wheel when the operator desires to make an intended maneuver, and particularly is this so when a U-turn is about to be made. Furthermore, the constant application of the hands to the steering wheel is sometimes a source of annoyance, and for this reason I have devised a button that is secured to the rim of the steering wheel of the automobile so that the machine may be guided by the application of the hand to the button, or the intended maneuver may be made by the manipulation of the steering wheel through the medium of the turning button.

In the accompanying drawing wherein for the purpose of illustration is shown a preferred embodiment of my invention, the numeral 6 designates, as a whole, a conventional steering wheel equipped with a rim 7 and spokes 8. My attachment is preferably secured to the rim 7, although it may be readily applied to the spokes, if desired.

Figure 1:
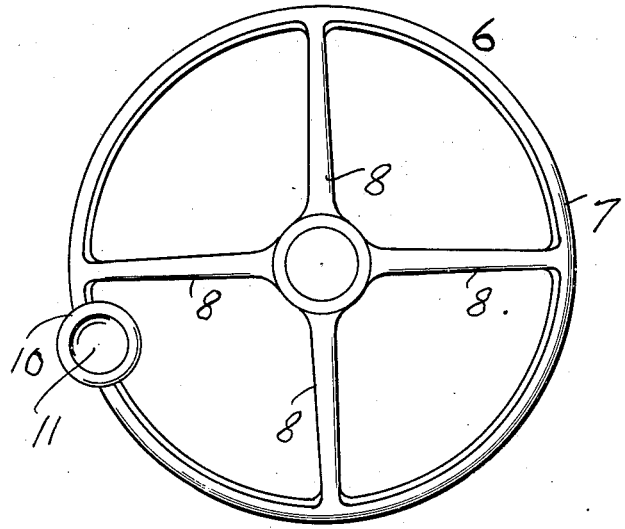
Figure 2:
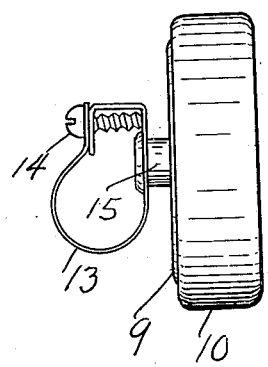
Fig. 2 is a side elevation of the button and the clamp for securing the same to the steering wheel rim.
Figure 3:
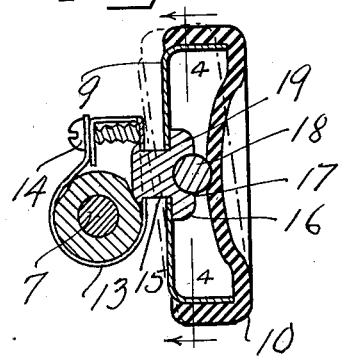
Fig. 3 is a central vertical sectional view of Fig. 2, and in Fig. 3 a section of the steering wheel rim is illustrated.
Figure 4:
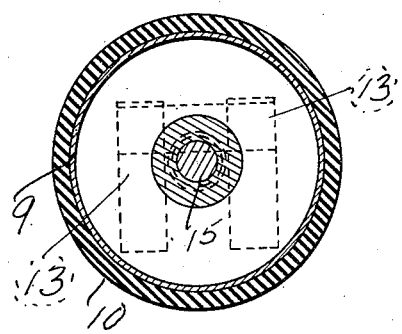
Fig. 4 is a vertical section, the view being taken on the line 4—4 of Fig. 3.
Figure 5:
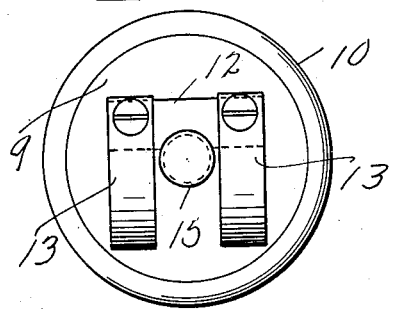
Fig. 5 is a bottom plan view of the button and its associated clamping member.

The steering button, as disclosed to advantage in Figs. 2 and 3, comprises a metallic cup-shaped base 9, to which there is secured a rubberized cover 10 of substantial thickness. It will be noted that the said cover is provided with a concave surface 11, which concavity causes a suction to be created when the palm of the hand of the operator engages the surface of the steering button. Due to the resiliency of the cover and because of its substantial thickness, it will snugly engage the base, and danger of accidental displacement of the cover will be eliminated. It will be obvious that the button per se, since it is of a two-piece construction—namely the base 9 and the rubber cover 10, will be most economical to construct and will also be highly serviceable in use.

To effect an efficient means for securing the button to the steering wheel, I employ a clamping element that comprises a top plate 12 that has extending therefrom a pair of spaced bands 13 that partly encircle or embrace the rim 7 of the steering wheel. Suitable fastening elements, such as screws 14, are employed to connect the extremities of the bands to the top plate 12.

It is the purpose of the invention to obtain a tilting and rotatable movement of the button relative to the fixed clamping means; and to obtain this universal tilting action, I secure to the plate 12 an extension or stub shaft 15 having an enlarged head 16 provided with a socket 17, in which a ball bearing 18 is seated. A central opening 19, provided in the base 9, permits the shaft to extend therethrough. There is thus provided a unique support for the steering button that permits freedom of angular movement and rotatable action of the button relative to the clamping means.

From the construction set forth it will be obvious that when the palm of the hand is placed over the concave surface, a definite vacuum or suction will be created, and the palm of the hand will be maintained in a fixed position relative to the vacuum surface of the steering button.

In the specification I have defined the member 10 as a button to indicate that it is a fastener—namely, it fastens to the palm of the hand. It is to be noted that it cannot be readily grasped by the fingers but, obviously, fits comfortably in the palm of the hand.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:

A steering wheel button comprising a base member and a rubberized cover secured thereto, said cover having a concave surface for receiving thereon the palm of the operator's hand, means for clamping said base member to a portion of the steering wheel, and means connecting said clamping means and said base member permitting a rotation and tilting of said button relative to said clamping means.

CLAUDE B. WOODSON.